United States Patent [19]

Hackmann et al.

[11] 3,761,593

[45] Sept. 25, 1973

[54] "METHODS OF CONTROLLING NEMATODES AND FUNGI USING 3,4-DICHLOROFUROXAN"

[75] Inventors: Johannes Thomas Hackmann, Enschede; Johannes Kuipers, Weesp, both of Netherlands

[73] Assignee: U.S. Philips Corporation, New York, N.Y.

[22] Filed: July 28, 1971

[21] Appl. No.: 166,982

[30] Foreign Application Priority Data

July 29, 1970   Netherlands...................... 7011186

[52] U.S. Cl. ............................................. 424/272
[51] Int. Cl. ......................... A01n 9/22, A01n 9/28
[58] Field of Search................. 424/272; 260/307 G

[56] References Cited
OTHER PUBLICATIONS

Chem. Abst. Vol. 59 (1963) Ungnade et al. pp. 11474–11475

Chem. Abst. Vol. 26 (1932) Birckenbach et al. pp. 3778–3779.

*Primary Examiner*—Jerome D. Goldberg
*Assistant Examiner*—Allen J. Robinson
*Attorney*—Frank R. Trifari

[57] ABSTRACT

It has been found that the known substance 3,4-dichlorofuroxan exerts a strong biocidal activity on nematodes and soil fungi. After being worked up into a pesticidal preparation the substance may be used for controlling these micro-organisms in doses which may vary between 4 kg to 40 kg of active substance per hectare.

2 Claims, No Drawings

"METHODS OF CONTROLLING NEMATODES AND FUNGI USING 3,4-DICHLOROFUROXAN"

It has been found that the compounds 3,4-dichlorofuroxan has a strong biocidal activity against nematodes and soil fungi and is suitable for use in controlling these organisms.

The substances 3,4 - dichlorofuroxan and its synthesis are described inter alia in Tetrahedron Letters 19, Suppl. 1, pages 143 – 154 (1963). A biological activity of 3,4 - dichlorofuroxan is not known from the literature.

The biological evaluation investigation on which the invention is based has shown that 3,4-dichlorofuroxan is particularly active against plant-parasitic soil nematodes, such, for example, as Heterodera, Rotylenchus, Pratylenchus and Meloidogyne species, and against soil fungi of the genus Rhizoctonia.

The control of the cyst-forming Meloidogyne spp. is of particular importance because representative of this genus cause damage in a large number of host plants. Examples of plants attacked by Meloidogyne spp. are cotton, tobacco, olive, sugar beet, tomato, capsicum, soya, hemp, tea, vine, flowers and fruit trees.

Examples of representatives of the Heterodera species, which also from cysts, are H. schachtii, which damages sugar beet, and H. rostochiensis, which produces soil sickness. The free-living nematodes of the genera Rotylenchus and Pratylenchus also greatly damage cultivated plants.

For example, the Pratylenchus species cause root rot of various plants. P. vulnurus damages walnuts and vines, whilst P.zeae infests maize and causes brown rot in tobacco.

The evaluation investigation has further shown that 3,4-dichlorofuroxan not only is active against adult nematodes, but also attacks the larvae and the eggs. The use of 3,4-dichlorofuroxan in the soil will inactivate the whole nematode population.

For practical use, 3,4-dichlorofuroxan is worked up into preparations suitable for soil treatment in the usual manner. Examples of soil treatment preparations according to the invention are an aqueous solution or an aqueous emulsion, an oil solution or an oil emulsion, a miscible oil and granules.

In all these preparations 3,4-dichlorofuroxan is mixed with a solid carrier material or dissolved or emulsified in a liquid carrier material, to which carrier materials adjuvants, such as surface-active substances, binders, lubricants and disintegrating agents, may be added. A few forms of preparations will now be described in more detail by way of example.

Granular preparations are produced, for example, by taking up the active substance in a solvent, after which granular carrier material, such as porous granules (for example pumice and attaclay) mineral non-porous granules (sand or ground marl) and organic granules (for example coffee grounds and cut tobacco stems) are impregnated with the resulting solution, if required in the presence of a binder.

A granular preparation may also be produced by compressing the active substance together with powdered minerals in the presence of lubricants and binders and subsequently disintegrating the comprimate and straining it to the desired grain size.

To produce miscible oils the active compound is dissolved or finely divided in a suitable solvent which preferably is poorly miscible with water, after which an emulsifier is added to the solution. Examples of suitable solvent are xylene, toluene, high-aromatic petroleum distillates, for example solvent naphtha, distilled tar oil and mixtures of these liquids. Examples of suitable emulsifiers are alkylphenoxypolyglycol ethers, polyoxy-ethylene sorbitan esters of fatty acids and polyoxyethylene sorbitol esters of fatty acids. The concentration of the active compound in the miscible oils is not restricted within narrow limits and may vary between 2 and 50 percent by weight. A miscible oil is a preparation in concentrated form, sometimes referred to as primary composition, which immediately before, or during, use is diluted with water. Aside from a miscible oil we may mention as a liquid and highly concentrated primary composition a solution of the active substance in a readily water-miscible liquid, for example acetone, to which solution a dispersing agent and, if required, a wetting agent are added.

The preparations according to the invention may furthermore include other biologically active substances. This broadens the spectrum of activity of the preparation and may produce synergism. The following known pesticidal substances are suitable for use in such a combination preparation: dibromochloropropane, dichloropropane, dichloropropene, ethylene dibromide, trichloronitromethane and mixtures of these substances such as, for example, the mixture of dichloropropane and dichloropropene commercially available under the trade name "D—D."

The preparations according to the invention may also include fertilizers. Thus, two soil treatments may be reduced to one, which may be of economic importance.

The compound 3,4-dichlorofuroxan is comparatively volatile and co-distils with water. Hence, when using a soil treatment preparation according to the invention this should be worked into the ground as rapidly as possible in order to minimize losses of active substance due to evaporation.

In a suitable method the soil treatment preparation according to the invention, for example a liquid or granular preparation, is spread on the soil in finely divided form and immediately dug in, harrowed in or plowed in. To achieve a satisfactory nematocidal and fungicidal effect, the soil need not be worked deeper than about 30 cm.

In another suitable method a preparation according to the invention is injected into the soil. Examples of a readily injectable preparations are an aqueous solution or an aqueous emulsion. In this method the soil injections are performed at regular intervals of from 5 to 30 cm. The injection depth should not exceed 30 cm. Since 3,4-dichlorofuroxan has a high mobility in the soil, it will also attack a nematode population at some distance from the point of injection. Although the active substance, 3,4-dichlorofuroxan, is slightly phytotoxic, no damage is caused to plants or seeds which are planted or dibbled in the treated ground. This fact, which may seem strange at first sight, is due to the comparatively rapid decomposition of 3,4-dichlorofuroxan in the soil. After a period of at most a few weeks the treated soil does no longer contain dichlorofuroxan. Consequently the use of preparations according to the invention has the advantage that it is not necessary to wait long between soil treatment and planting.

It has further been found that plants which have been planted out in a plot a short time after the soil thereof has been treated with 3,4-dichlorofuroxan are stimulated in their growth. A green house test has shown that tomato plants which have been planted in soil treated with 3,4-dichlorofuroxan grow appreciably better than plants grown in non-treated soil. Surprisingly this even applies if the soil is not infected with nematodes. Thus, the use of the preparations according to the invention not only ensures nematode control but also provides the advantage of an increased yield.

The dosage of the preparation according to the invention depends upon various factors, such as the species of the nematode or fungus to be controlled, the degree of infection of the soil, the formulation of the preparation and the method of soil treatment.

In general the dose will vary between 4 and 40 kg of active substance per hectare, whilst especially a dose of from 10 to 25 kg per hectare will give satisfactory results in most cases.

The invention will now be described more fully with reference to the following Examples:

1. Test regarding activity against Meloidogyne incognita.

Sandy soil heavily infected with M. incognita (about 3,500 larvae per 500 g of soil) is treated with a preparation according to the invention, for example an aqueous solution or a granular preparation, in doses which vary from 6.5 to 50 kg of 3,4-dichlorofuroxan per hectare. A few weeks after this soil treatment 2-kg amounts of the treated soil are put into and then planted with tomato seedlings. The soil temperature is 25°C. After 6 weeks it is ascertained whether, and if so, to what degree, the root system of the plants is attacked by nematodes. The results show that at a dose of 30 kg of 3,4-dichlorofuroxane per hectare M. incognita is fully controlled. At a dose corresponding to 15 kg of 3,4-dichlorofuroxan per hectare a great reduction of nematode infestation is found.

2. Test regarding the activity against Rotylenchus uniformis.

Sandy soil infected with R. uniformis is treated with 3,4-dichlorofuroxan in doses which correspond to from 7.5 to 30 kg of active substance per hectare. The soil temperature is 23°C. One or two weeks after the soil treatment the mortality percentage of R. uniformis is determined. From the results it may be deduced that even after only one week the maximum mortality is reached, in other words, 3,4-dichlorofuroxan acts very quickly. At a dosage of 15 kg of active substance per hectare the mortality percentage is about 90 percent.

3. Test regarding the activity against Heterodera rostochiensis.

Sandy soil containing cysts of H. rostochiensis is treated with preparations according to the invention, such as injectable preparations, aqueous solutions and emulsions. The doses correspond to 7.5, 15 and 30 kg of active substance per hectare. The soil temperature is 25°C. After 2 weeks the cysts are transferred to a potato-root diffusate. At three-day intervals, it is determined whether, and if so how many, larvae have developed. The The results show that at a a dosage corresponding to 30 kg of active substance per hectare no larval development takes place.

4. Test regarding fungicidal activity.

Preparations according to the invention are mixed in different dosages with unsterilized soil. The soil is then infected with an amount of a comminuted agitation culture if R. solani. About 5 cm long pieces of flax straw are vertically inserted into the soil. After 24 hours these strawsaare washed with tap water and laid in horizontal position on a 2 percent water agar culture medium. Twenty-four hours later it is ascertained whether, and if so in what degree, R. solani has grown around the straw. The results show that a dose corresponding to 9 kg of active substance per hectare results in complete control of R. solani.

5. Production of a miscible oil.

25 % w/v of 3,4-dichlorofuroxan and 5 % w/v of an emulsifier which consists of a mixture of alkylphenoxypolyglycol ethers and anion-active alkylbenzenesulfonates are mixed and taken up in xylene.

6. Production of a granular preparation.

A granular preparation according to the invention is obtained by dusting 5 percent by weight of 3,4-dichlorofuroxan on attapulgite granules. In a modified embodiment of this method, 5 percent by weight of 3,4-dichlorofuroxan and 5 percent by weight of cetyl alcohol which have been taken up in petroleum-ether are sprayed in 90 parts by weight of attapulgite granules, after which the petroleum ether is removed by evaporation.

7. Production of a granular preparation.

25 parts by weight of powdered attaclay are impregnated with 5 parts by weight of 3,4-dichlorofuroxan and mixed with 3 parts by weight of sulphite waste liquor and 65 parts by weight of powdered dolomite. After the addition of a small amount of water the mixture is compressed, then disintegrated and strained to the desired particle size.

What is claimed is:

1. A method of controlling soil dwelling nematodes comprising applying to said nematodes, a nematocidally effective amount of 3, 4-dichlorofuroxane.

2. A method of controlling soil dwelling fungi comprising applying to said fungi, a fungicidally effective amount of 3,4-dichlorofuroxane.

* * * * *